US008243346B2

(12) United States Patent
Suzuki

(10) Patent No.: US 8,243,346 B2
(45) Date of Patent: Aug. 14, 2012

(54) RECORDING MEDIUM AND RECORDING APPARATUS

(75) Inventor: Katsuhito Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 813 days.

(21) Appl. No.: 12/243,198

(22) Filed: Oct. 1, 2008

(65) Prior Publication Data

US 2009/0103145 A1 Apr. 23, 2009

(30) Foreign Application Priority Data

Oct. 18, 2007 (JP) ................................ 2007-270980

(51) Int. Cl.
*H04N 1/04* (2006.01)

(52) U.S. Cl. .......... 358/474; 358/498; 358/488; 355/22; 359/618; 359/619; 271/275; 428/32.1; 347/101

(58) Field of Classification Search .................. 358/474, 358/498, 496, 497, 488; 355/22; 359/619, 359/629, 618, 623; 271/275; 428/32.1, 32.22; 347/19, 2, 101
See application file for complete search history.

(56) References Cited

U.S. PATENT DOCUMENTS 3,471,930 A * 10/1969 Shapiro ........................ 33/27.09
4,469,430 A * 9/1984 Terashima .................... 347/134
5,184,184 A * 2/1993 Hayashi et al. ................. 399/35
5,266,995 A * 11/1993 Quadracci et al. .............. 355/77
5,488,451 A * 1/1996 Goggins ......................... 355/77
5,617,178 A * 4/1997 Goggins ......................... 355/22
5,812,152 A * 9/1998 Torigoe et al. .................... 347/2
5,835,194 A * 11/1998 Morton ........................... 355/22
5,847,808 A * 12/1998 Goggins ......................... 355/22
5,896,230 A * 4/1999 Goggins ....................... 359/619
5,967,032 A * 10/1999 Bravenec et al. ............. 101/211
6,091,479 A * 7/2000 Frosig et al. .................... 355/22
6,139,162 A * 10/2000 Masaki ......................... 362/618
6,414,794 B1 * 7/2002 Rosenthal ..................... 359/619
6,751,024 B1 * 6/2004 Rosenthal ..................... 359/626
6,796,502 B2 * 9/2004 Nogami et al. ............... 235/454
6,956,679 B2 * 10/2005 Hatano ......................... 358/474
7,042,599 B2 * 5/2006 Yokota et al. ................. 358/475
7,136,203 B2 * 11/2006 Yokota et al. ................. 358/484
7,413,189 B2 * 8/2008 Graef et al. ................... 271/272
7,434,801 B2 * 10/2008 Yang ............................ 271/171
7,463,275 B2 * 12/2008 Nakamura et al. ............ 347/224
7,547,100 B2 * 6/2009 Nakashima ................... 347/104
7,663,769 B2 * 2/2010 Hayashihara et al. ........ 356/630
7,770,040 B2 * 8/2010 Aleksic et al. ................ 713/320
2002/0041402 A1 * 4/2002 Hatano ......................... 358/498
2003/0090747 A1 * 5/2003 Fang et al. .................... 358/498
2003/0129008 A1 7/2003 Seto
2007/0040884 A1 * 2/2007 Shoki ........................... 347/101
2009/0128866 A1 * 5/2009 Okamoto et al. ............. 358/498

FOREIGN PATENT DOCUMENTS

JP 08-137034 5/1996
JP 2007-041435 2/2007
JP 2007-118434 A 5/2007
JP 2007-130769 5/2007

* cited by examiner

*Primary Examiner* — Negussie Worku
(74) *Attorney, Agent, or Firm* — Maschoff Gilmore & Israelsen

(57) ABSTRACT

A recording medium includes lenticules and a guided portion guided by a guide portion which is provided in a supporter for supporting the recording medium provided on a recording apparatus carrying out a recording on the recording medium, so that the recording medium is guided in a predetermined conveying direction.

6 Claims, 15 Drawing Sheets

RECORDING MEDIUM AND RECORDING APPARATUS

BACKGROUND

1. Technical Field

The present invention relates to a recording medium having lenticules, and a recording apparatus which can carry out a recording on the recording medium.

2. Related Art

A recording medium has heretofore been known which has lenticules superimposed on a recording layer, whereby an image recorded on the recording layer can be seen via the lenticules as a three-dimensional image or a variable picture image which changes a visible aspect when looked at from different angles. In order to arrange in such a way that an image recorded on such a recording medium can be seen as a predetermined three-dimensional image or variable picture image, it is necessary to carry out a recording in such a way as to accurately match a position of the recording on the recording layer with a lens array of the lenticules. For this reason, for example, Japanese Patent No. 3,471,930 discloses a method which detects a position of lenticules using a sensor and, based on a result of the detection, carries out a recording in a desired position. Also, JP-A-2007-130769 discloses a method which applies a measure to prevent a recording medium placed on a conveying tray from being displaced on the tray, improving an accuracy of a recording position.

However, in a case of using the method of Japanese Patent No. 3,471,930, it being necessary to provide the sensor, there is a problem of creating rising costs. Also, in a case of using the method of JP-A-2007-130769, although it is possible to prevent the displacement of the recording medium with respect to the conveying tray, in the event that the conveying tray is conveyed in a condition in which it is inclined with respect to a conveying direction, it is impossible to improve the accuracy of the recording position.

SUMMARY

Various embodiments provide a recording medium and recording apparatus which can improve an accuracy of a recording position with a simple configuration.

According to one embodiment, there is provided a recording medium including lenticules and a guided portion guided by a guide portion which is provided in a supporter for supporting the recording medium provided on a recording apparatus carrying out a recording on the recording medium, so that the recording medium is guided in a predetermined conveying direction.

By configuring the recording medium in this way, as the recording medium is conveyed along the recording medium guide groove, it is possible to keep the conveying direction of the recording medium constant, improving the accuracy of the position of the recording on the recording medium.

Also, according to one embodiment, the guide portion is a guide groove, and the guided portion is a raised strip fitting into the guide groove.

By configuring the recording medium in this way, it is possible to more reliably maintain a guiding condition.

Also, according to one embodiment, the guided portion is detachably attached to a portion of the lenticules, and an adhesive surface has the same shape as the lenticules.

By configuring the recording medium in this way, the guided portion can be attached to the recording medium without any difference between individual recording mediums.

Also, according to one embodiment, a plurality of the guided portions are provided.

By configuring the recording medium in this way, it is possible to keep the conveying direction of the recording medium more constant, improving the accuracy of the position of the recording on the recording medium.

Also, according to one embodiment, the guided portion is provided outside a recording area of the recording medium, and a separation structure is formed between the guided portion and the recording area.

By configuring the recording medium in this way, it is possible to easily separate the guided portion from the recording area.

Also, according to one embodiment, the guided portion protrudes from at least one edge in the conveying direction of the recording medium.

By configuring the recording medium in this way, when fitting the guided portion into the guide portion, it is possible to easily align the guided portion with the guide portion, using as a guide a portion of the guided portion protruding from a front end of the recording medium. Also, by the guided portion being provided with a portion protruding from a back end of the recording medium, as the guided portion can be guided by the guide portion until a recording on the recording medium is completed, it is possible to more reliably maintain the guiding condition.

According to one embodiment, there is provided a recording apparatus which, as well as conveying a recording medium having lenticules, carries out a recording on the recording medium, and includes a supporter which supports the recording medium, and a guide portion which, being provided in the supporter, guides the guided portion provided in the heretofore described recording medium.

By configuring the recording apparatus in this way, as the recording medium is conveyed along the recording medium guide groove, it is possible to keep the conveying direction of the recording medium constant, improving the accuracy of the position of the recording on the recording medium.

Also, according to one embodiment, the guide portion is fixed to the supporter.

By configuring the recording apparatus in this way, as it is possible to prevent a change in the guiding condition in which the guided portion is guided by the guide portion and the guide groove, and reliably carry out the guiding, it is possible to keep the conveying direction of the recording medium constant, improving the accuracy of the position of the recording on the recording medium.

Also, according to one embodiment, a portion of the guide portion which makes sliding contact with the guided portion is subjected to an abrasion resistance treatment.

By configuring the recording apparatus in this way, it is possible to prevent an abrasion and deformation of the guide portion. For this reason, it is possible to maintain the conveying direction of the recording medium, improving the accuracy of the position of the recording on the recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereafter, a description will be given, while referring to FIGS. 1 to 3, of a lens sheet 1, and a recording apparatus 2, according to a first embodiment of the invention.

Figure 1:
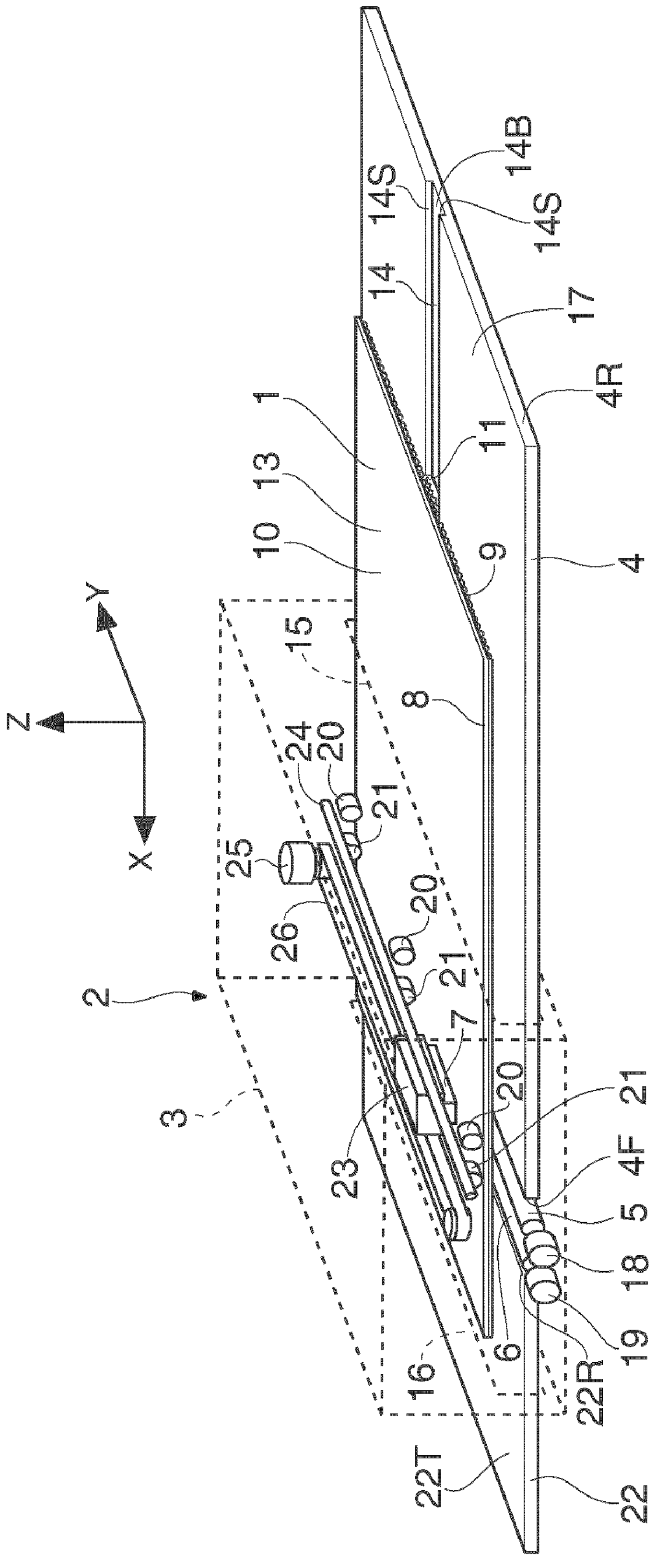
FIG. 1 is a backward perspective view of a lens sheet and recording apparatus according to a first embodiment of the invention.

FIG. 1, being an outlined configuration view showing an outlined configuration of the recording apparatus 2 in a condition in which it is loaded with the lens sheet 1 as a recording medium, is a perspective view of the recording apparatus 2 seen from behind. FIG. 2 is a view showing a condition in which the lens sheet 1 is removed from the recording apparatus 2 shown in FIG. 1. FIG. 3 is an exploded perspective view showing a configuration of the lens sheet 1. In the following description, in FIGS. 1 and 2, a direction of the arrow X, which is a direction in which the lens sheet 1 advances, is taken as being forward (a front), and a direction opposite thereto as being backward (a back). Also, a direction of the arrow Y which is a right direction looking forward from behind is taken as being rightward (a right), and a left direction, which is a direction opposite thereto, as being leftward (a left). Then, a direction of the arrow Z is taken as being upward (a top), and a direction opposite thereto as being downward (a bottom).

The recording apparatus 2 includes a housing 3, which is an exterior body, a sheet guide 4 as a supporter, on which is placed the lens sheet 1, and which guides an underside of the lens sheet 1, a feed roller 5, and a discharge roller 6, which convey the lens sheet 1, placed on the sheet guide 4, from the back toward the front, a recording head 7, which carries out a recording on the lens sheet 1, and the like.

Figure 2:
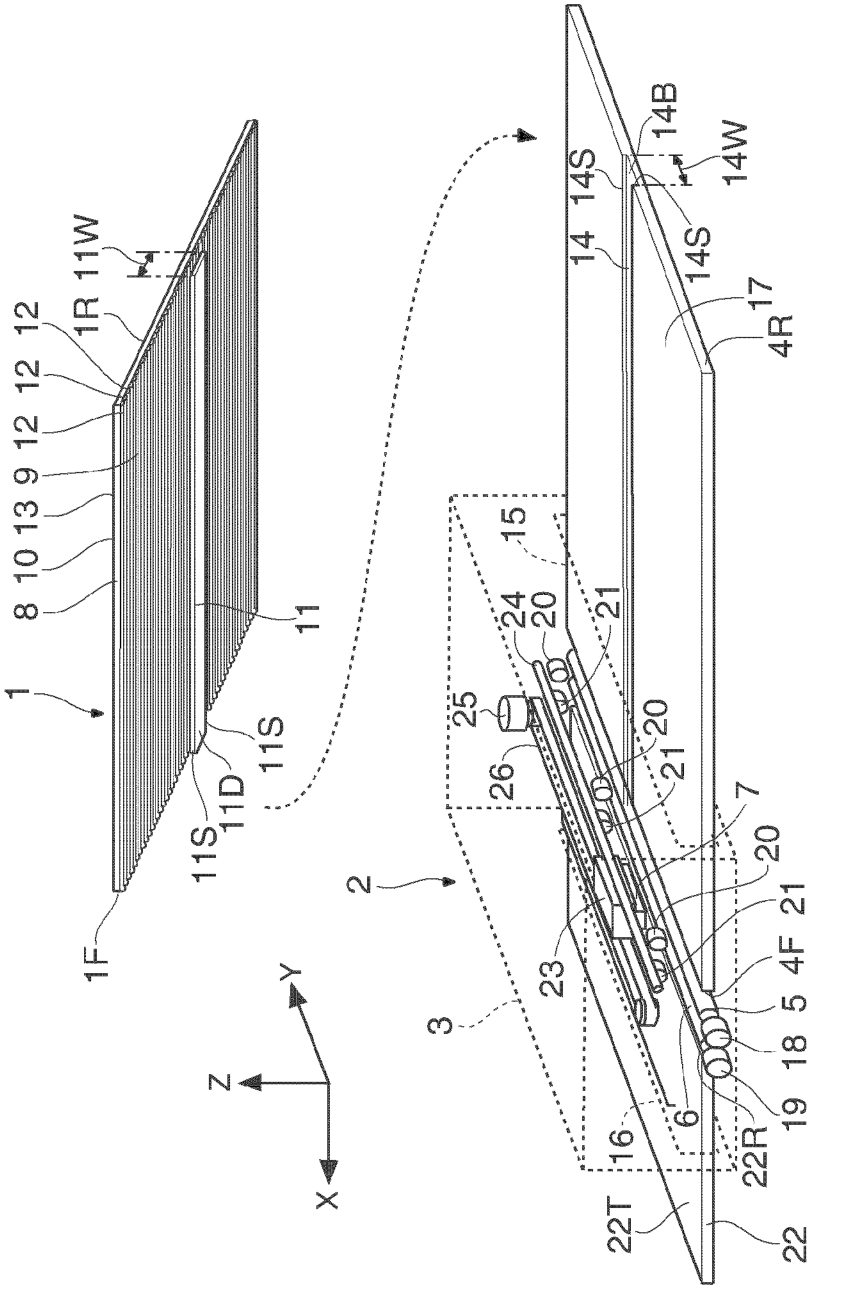
FIG. 2 is a view showing a condition in which the lens sheet is removed from the recording apparatus shown in FIG. 1.
Figure 3:
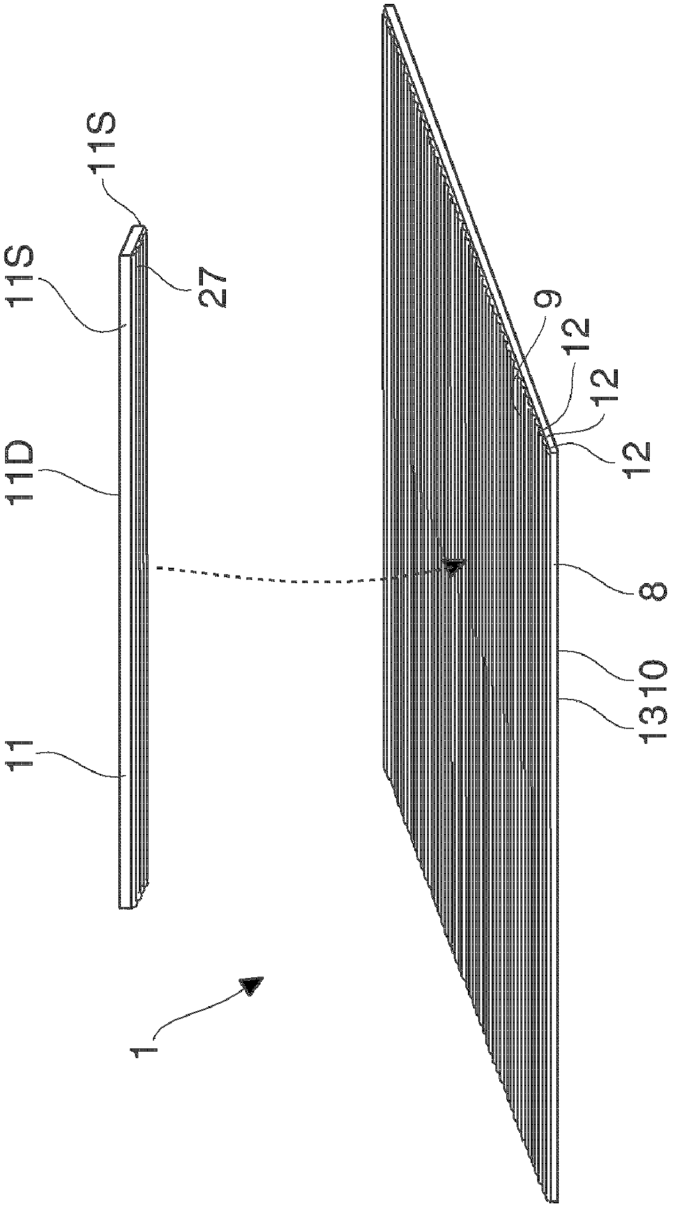
FIG. 3 is an exploded view showing a configuration of the lens sheet shown in FIGS. 1 and 2.

In the lens sheet 1, as shown in FIG. 2, lenticules 9 are formed on one surface of a transparent resin sheet 8, while an image forming layer 10 is formed on the other surface. The lens sheet 1 is configured in such a way that an image recorded on the image forming layer 10 is visible via the lenticules 9. Consequently, for example, a parallactic image is recorded on the image forming layer 10, corresponding to an array pitch, a focal distance, or the like, of the lenticules 9 and, on observing the image from the lenticules 9 side, it can be seen as a stereoscopic image, or an image changing when looked at from different angles. It is also acceptable that the lens sheet 1 is of a configuration such that, rather than the image forming layer 10 being formed, a recording is carried out directly on a resin portion of a surface opposite to the side on which are formed the lenticules 9.

Also, a raised strip 11 is provided as a guided portion on the side of the lens sheet 1 on which are formed the lenticules 9. The raised strip 11 is provided from a back end edge 1R all the way to a front end edge 1F, in a front-back direction, that is, in a striation direction (bus direction) of lens elements 12 (for example, cylindrical lenses) configuring the lenticules 9, in an approximate center in a right-left direction of the lens sheet 1. Right and left side surfaces 11S of the raised strip 11 are surfaces perpendicular to a top surface of the lens sheet 1, that is, a recording surface 13 on which a recording is carried out by the recording head 7, and form smooth planes which, being parallel to each other, extend in the striation direction of the lens elements 12. Also, a bottom surface 11D of the raised strip 11 forms a smooth plane parallel to the recording surface 13. The raised strip 11 configured in this way is fitted into a guide groove 14 provided in the recording apparatus 2, to be described hereafter, and guided by the guide groove 14.

A feed opening 15 for supplying the lens sheet 1 placed on the sheet guide 4 into the housing 3 is formed in a back side surface of the housing 3, and also, a discharge opening 16 for discharging the lens sheet 1 supplied from the feed opening 15 side is formed in a front side surface. The lens sheet 1 supplied from the feed opening 15 to the recording apparatus 2 is conveyed forward by the feed roller 5 and the discharge roller 6 and, while it is being conveyed, a recording is carried out on it by the recording head 7.

As shown in FIGS. 1 and 2, the sheet guide 4, taking on a shape of a rectangular plate-like body as a whole, is provided extending in the front-back direction from a position, into which it projects backward from the feed opening 15, all the way to a position short of the feed roller 5, and has a size, and a shape, such that the lens sheet 1 can be placed all over it. The top surface of the sheet guide 4, that is, a conveying surface 17 on which the lens sheet 1 placed thereon is conveyed, is disposed in a position which is approximately level with tops of the feed roller 5 and discharge roller 6. The sheet guide 4 is mounted on the housing 3 or a structure such as an internal frame by means of unshown components. The guide groove 14 into which is fitted the raised strip 11 is formed in the conveying surface 17 of the sheet guide 4.

The guide groove 14 is formed in a predetermined conveying direction of the lens sheet 1 in the recording apparatus 2, that is, in the embodiment, in a direction perpendicular to a main scanning direction which is a moving direction of the recording head 7. The guide groove 14, being provided in an approximate center in a right-left direction of the sheet guide 4, passes through the sheet guide 4 from a front end edge 4F to a back end edge 4R, and takes on a rectangular shape in a cross-sectional shape seen from behind. That is, right and left inner side surfaces 14S of the guide groove 14 are perpendicular to the conveying surface 17 on which the lens sheet 1 is placed and conveyed, and the right and left inner side surfaces 14S form smooth planes extending parallel to each other in the front-back direction in such a way as to be perpendicular to the main scanning direction. Also, an inner bottom surface 14B of the guide groove 14 forms a smooth plane parallel to the conveying surface 17.

The raised strip 11 of the lens sheet 1 and the guide groove 14 of the sheet guide 4 are configured in such a way that, when the raised strip 11 is fitted into the guide groove 14, it does not happen that the raised strip 11 jolts in the right-left direction with respect to the guide groove 14, and the lens sheet 1 attains a condition in which it can move in the front-back direction with respect to the sheet guide 4. That is, a width 14W of the guide groove 14 and a width 11W of the raised strip 11 each has a dimensional tolerance set in such a way that, when the raised strip 11 is fitted into the guide groove 14, the raised strip 11 does not jolt in the right-left direction with respect to the guide groove 14, and the lens sheet 1 can be moved in the front-back direction with respect to the sheet guide 4.

The feed roller 5 is rotationally driven by a feed motor 18, and also, the discharge roller 6 is rotationally driven by a discharge motor 19. For example, three feed side driven rollers 20, which rotate in accordance with the rotation of the feed roller 5, are provided in the right-left direction above the feed roller 5. Also, for example, three discharge side driven rollers 21, which rotate in accordance with the rotation of the discharge roller 6, are provided in the right-left direction above the discharge roller 6. Consequently, the lens sheet 1 supplied to the recording apparatus 2 from the feed opening 15 is nipped between the feed roller 5 and the feed side driven rollers 20, and between the discharge roller 6 and the discharge side driven rollers 21 and, by the feed roller 5 and the discharge roller 6 rotating, is conveyed from the back toward the front. Then, after a recording has been carried out on the lens sheet 1 being conveyed by the recording head 7, the lens sheet 1 is discharged from the discharge opening 16 into an exterior of the recording apparatus 2.

A discharge side sheet guide 22 supporting the bottom surface of the lens sheet 1, on which the recording has been carried out by the recording head 7, and which is discharged from the discharge opening 16, is provided in front of the discharge roller 6. A height of a top surface 22T, and a length in the front-back direction, of the discharge side sheet guide 22 are set in such way that it does not happen that, the lens sheet 1 sent away from the discharge roller 6 sagging downward, the raised strip 11 comes off from the guide groove 14, and also, the front end edge 11F of the raised strip 11 of the lens sheet 1 hits a back end edge 22R of the discharge side sheet guide 22.

The recording head 7 is disposed above and between the feed roller 5 and the discharge roller 6. The recording head 7 being mounted on a bottom surface of a carriage 23, in the embodiment, it is configured as an ink jet type of recording head which ejects ink. The carriage 23 is movably supported on a carriage guide 24 extended in the right-left direction, and also, is mounted on a timing belt 26 driven by a carriage motor 25. For this reason, on the timing belt 26 being rotationally driven in the right-left direction by the carriage motor 25, along with the carriage 23, the recording head 7 can move in the right-left direction along the carriage guide 24.

Consequently, by controlling a conveyance of the lens sheet 1 in a sub-scanning direction, which is a conveying direction thereof, by means of the feed roller 5 and the discharge roller 6, as well as controlling the movement of the recording head 7 in the main scanning direction which is the moving direction thereof, that is, in the right-left direction, it being possible to move the recording head 7 to a predetermined position on the lens sheet 1, it is possible to record an image in a desired position on the lens sheet 1. The lens sheet 1 is placed on the sheet guide 4 in such a way that, the image forming layer 10 side being caused to face the recording head 7, the lenticules 9 make contact with the sheet guide 4. That is, a recording being carried out on the image forming layer 10 by the recording head 7, a recorded article is produced in which an image recorded on the image forming layer 10 can be visually perceived from the lenticules 9 side.

In a case of carrying out a recording on the lens sheet 1 by means of the recording apparatus 2 configured in the heretofore described way, the lens sheet 1 is placed on the sheet guide 4 in such a way that the lenticules 9 side is caused to face the conveying surface 17 of the sheet guide 4, and also, the raised strip 11 is fitted into the guide groove 14. The raised strip 11 and the guide groove 14, as heretofore described, have the dimensional tolerance set in such a way that the raised strip 11 does not jolt in the right-left direction with respect to the guide groove 14, and the lens sheet 1 can move in the front-back direction with respect to the sheet guide 4. Consequently, the lens sheet 1 attains a condition in which a positioning thereof in the right-left direction (main scanning direction) has been carried out by means of the fitting of the raised strip 11 into the guide groove 14. That is, the lens sheet 1 is positioned by means of the raised strip 11 and the guide groove 14 in such a way as not to rotate on the sheet guide 4 or move in the right-left direction.

For this reason, by the lens sheet 1, conveyed by the feed roller 5 and the discharge roller 6, being conveyed in a condition in which a constant conveying direction is maintained in a direction perpendicular to the main scanning direction, a recording on the lens sheet 1 by means of the recording head 7 can be carried out in the predetermined position.

Herein, a description will be given, while referring to FIG. 3, of a way of providing the raised strip 11 on the lens sheet 1. As shown in FIG. 3, the raised strip 11, being created separately from the lens sheet 1, is to be detachably attached to the lens sheet 1, as will be described hereafter. The raised strip 11 is created, for example, by a lens sheet, which is separate from, and has the same configuration as, the lens sheet 1, being cut into pieces of regular widths in the striation direction of the lens elements, and clipped out. The raised strip 11 clipped out from the clip-out lens sheet in this way has on one surface a lenticular portion 27 of the same shape as that of the lenticules 9 of the lens sheet 1, and cutting planes from the clip-out lens sheet form the side surfaces 11S. Also, a recording surface portion of the clip-out lens sheet forms the bottom surface 11D. When clipping out the raised strip 11 from the clip-out lens sheet, a cutting is carried out in such a way that the cutting planes forming the side surfaces 11S of the raised strip 11 are perpendicular to the recording surface of the lens sheet to be clipped out, making the side surfaces 11S and the bottom surface 11D perpendicular to each other.

The lenticular portion 27 side of the raised strip 11 created in this way is caused to face the lenticules 9 of the lens sheet 1, and also, a striation direction of the lenticular portion 27 is aligned with the striation direction of the lenticules 9. Then, the lenticular portion 27 of the raised strip 11 is attached to the lenticules 9 of the lens sheet 1 in a detachable condition. By bonding the raised strip 11 and the lens sheet 1 together using, for example, an adhesive with a readhesive quality such as a silicone adhesive or an acrylic adhesive, it is possible to carry out a detachable attachment of the raised strip 11 to the lens sheet 1. In the raised strip 11 attached to the lens sheet 1 in this way, the right and left side surfaces 11S form surfaces which are perpendicular to the recording surface 13, and which also, being parallel to each other, extend in the striation direction (bus direction) of the lens elements 12. Also, the bottom surface 11D of the raised strip 11 is parallel to the recording surface 13.

Consequently, in the lens sheet 1 conveyed on the sheet guide 4 while causing the guide groove 14 to guide the raised strip 11 with the raised strip 11 fitted into the guide groove 14, by the lens sheet 1 being conveyed in the main scanning direction in the condition in which the constant conveying direction is maintained, a recording on the lens sheet 1 by means of the recording head 7 is carried out in the predetermined position.

The raised strip 11, being created by cutting the lens sheet of the same configuration as that of the lens sheet 1 in the striation direction of the lenticules in the heretofore described way, takes on a shape of an elongated strip-shaped sheet body of the same wall thickness as that of the lens sheet 1. For example, a right-left direction width of the lens sheet 1 is largely 24 cm so as to correspond to a lateral direction of an A4 size sheet, while the raised strip 11 has a right-left direction width of around 1 cm. For this reason, the lens sheet 1 itself has a property of sagging greatly as a whole, but the raised strip 11, as its right-left direction width is narrow, has a smaller amount of sagging with respect to a stress from the right-left direction. Although the raised strip 11 is a sheet body having a flexibility in this way, by narrowing a width in a stressed direction, it being possible to reduce an amount of sagging, the raised strip 11 is less deformed when guided by the guide groove 14, easily keeping the conveying direction of the lens sheet 1 constant.

The guide groove 14, by being integrally formed with the sheet guide 4, is configured fixed to the sheet guide 4. For example, by creating the sheet guide 4 by means of a molding, it is possible to integrally mold the guide groove 14 with the sheet guide 4. Also, by a portion of the sheet guide 4 corresponding to the guide groove 14 being cut too, it being possible to integrally form the guide groove 14 with the sheet guide 4, the guide groove 14 can be configured fixed to the sheet guide 4.

In this way, by forming the guide groove 14 integrally with, and fixing it to, the sheet guide 4, the width 14W of the guide groove 14 can be made invariable and fixed. For this reason, a guiding of the raised strip 11 can be reliably carried out without a guiding condition thereof changing, easily keeping the conveying direction of the lens sheet 1 constant.

Meanwhile, when a conveyance of the lens sheet 1 is carried out, the raised strip 11 and the inner side surfaces 14S of the guide groove 14 make sliding contact with each other. Therein, it is also acceptable to arrange in such a way that, by applying a measure such as attaching a metal tape, or coating with a fluororesin, the inner side surfaces 14S are provided with abrasion resistance. By providing the inner side surfaces 14S with abrasion resistance in this way, it being possible to suppress an abrasion and deformation of the inner side surfaces 14S, it is possible to maintain a conveying accuracy of the lens sheet 1 over a long period or a large number of conveyances.

With regard to a bonding of the raised strip 11 to the lens sheet 1, as heretofore described, it is necessary to bond them together in such a way that the lenticular portion 27 of the raised strip 11 and the lenticules 9 of the lens sheet 1 are aligned with the striation direction, but the bonding is carried out, for example, in the following way.

An adhesive material with which a bonding of the raised strip 11 to the lens sheet 1 is carried out is applied to the lenticular portion 27 side of the raised strip 11, and a nonadhesive portion to which no adhesive material is applied is provided in one portion of the lenticular portion 27. When bonding the raised strip 11 to the lenticules 9, firstly, only the nonadhesive portion of the lenticular portion 27 is aligned with the lenticules 9. Then, in the aligned condition, the raised strip 11 is moved slightly in the left or right direction, and rotated in the left or right direction, attaining a condition in which the lenticular portion 27 and the lenticules 9 mesh with each other, and the raised strip 11 does not move in the right-left direction. When in this condition, a condition is attained in which the striation direction of the lenticular portion 27 of the raised strip 11 is aligned with that of the lenticules 9 of the lens sheet 1. Then, a portion of the lenticular portion 27 to which the adhesive material is applied is aligned with, and bonded to, the lenticules 9, fixing the raised strip 11 to the lens sheet 1.

By making a pitch of the lenticular portion 27 of the raised strip 11 the same as that of the lenticules 9 of the lens sheet 1, it is possible to easily provide the raised strip 11 on the lens sheet 1 in the striation direction of the lenticules 9. Also, in the condition in which the lenticular portion 27 meshes with the lenticules 9, as the condition is attained in which the striation direction of the lenticular portion 27 is aligned with that of the lenticules 9, it is possible to provide the raised strip 11 on the lens sheet 1 in the striation direction of the lenticules 9 without any difference between individual lens sheets 1.

When both the lens sheet 1 and the raised strip 11 are transparent ones which are not provided with the image forming layer 10, with regard to a determination as to whether or not the striation direction of the lenticular portion 27 is aligned with that of the lenticules 9, it is also acceptable that interference fringes of light transmitted from the raised strip 11 to the lenticules 9 (or from the lenticules 9 to the raised strip 11) are observed in the condition in which the nonadhesive portion is aligned with the lenticules 9, and a condition in which the interference fringes have disappeared is identified as the striation direction of the lenticular portion 27 being aligned with that of the lenticules 9.

Lens Sheet Modification Example 1

Figure 4:
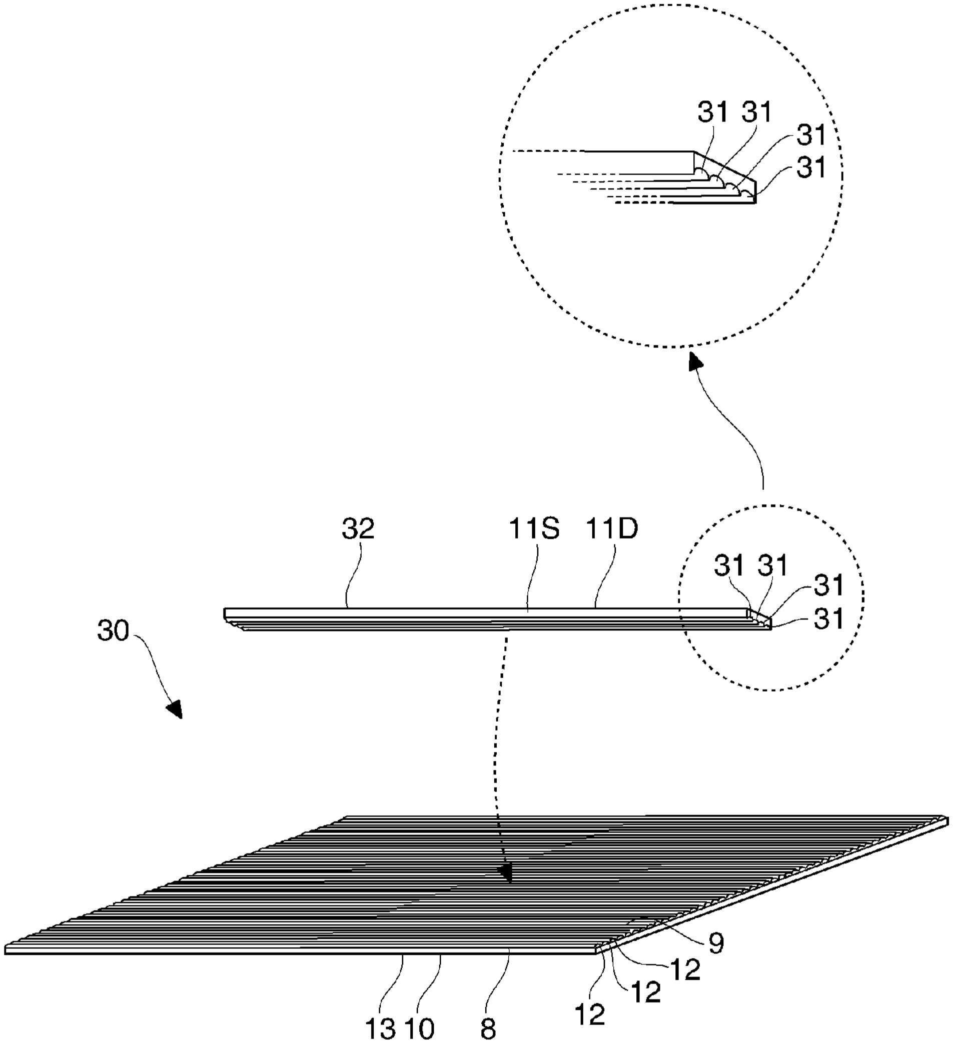
FIG. 4 is an exploded view showing a configuration of a first modification example of the lens sheet.

FIG. 4 shows a lens sheet 30 which is a first modification example of the lens sheet 1. Identical reference numerals being given to the same components as those described in the first embodiment, a description thereof will be omitted.

In the raised strip 11 of the lens sheet 1, the lenticular portion 27 has the same shape as the lenticules 9. However, the lens sheet 30 has a raised strip 32, which has depressions 31 into which the lenticules 9 are closely fitted, as a guided portion in place of the raised strip 11. The raised strip 11, as its lenticular portion 27 is of the same shape as the lenticules 9, can be created by clipping it out from the clip-out lens sheet of the same configuration as the lens sheet 1, as heretofore described, but the raised strip 32 is created by means of a resin molding or the like using a different tool separate from that of the lens sheet 1. Then, the raised strip 32 is bonded to the lens sheet 1 by means of an adhesive with a readhesive quality in such a way that the lenticules 9 of the lens sheet 1 are fitted into the depressions 31.

Lens Sheet Modification Example 2

Figure 5:
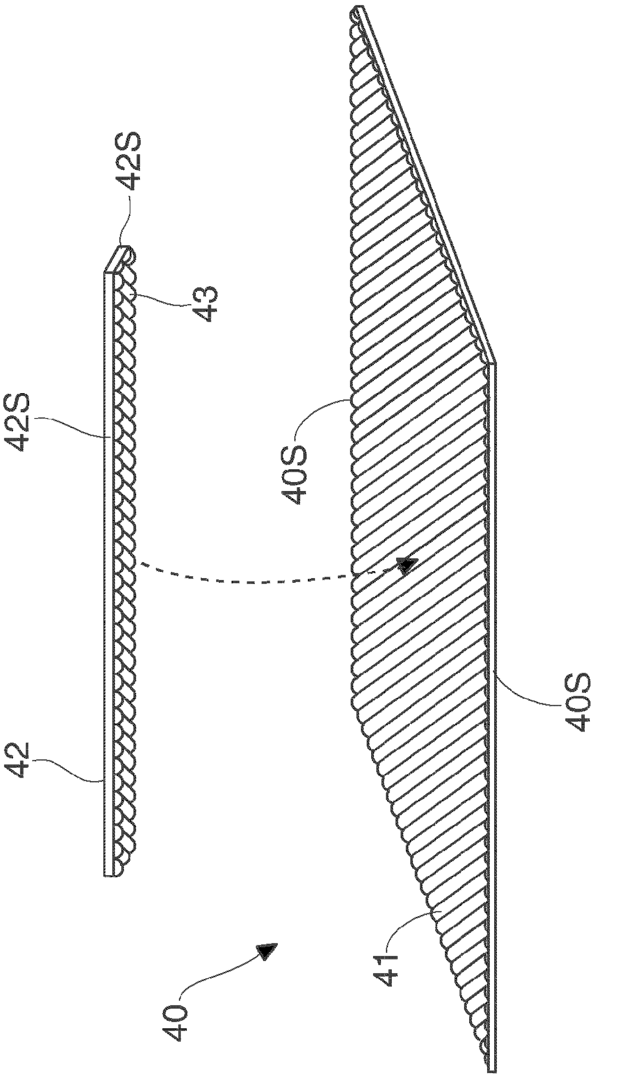
FIG. 5 is an exploded view showing a configuration of a second modification example of the lens sheet.

FIG. 5 shows a configuration of a lens sheet 40 which is a second modification example of the lens sheet 1.

The lens sheet 40 is one referred to as a so-called oblique lens sheet, on which lenticules 41 are disposed with their striation direction slanted to a side edge of the lens sheet 40. A raised strip 42 provided as a guided portion on this kind of lens sheet 40 has a lenticular portion 43 formed in the same shape as the lenticules 41. Furthermore, right and left side surfaces 42S of the raised strip 42 are made parallel to each other. Also, an angle formed by the lenticular portion 43 and each side surface 42S is identical to an angle formed by the lenticules 41 and each side surface of the lens sheet 40. That is, for example, the raised strip 42 is created by clipping it out in a strip shape from the same lens sheet as the lens sheet 40 in such a way that portions corresponding to the side surfaces 42S are parallel to side edges of the same lens sheet.

In this way, the lenticular portion 43 is formed in the same shape as the lenticules 41, and the angle formed by the lenticular portion 43 and each side surface 42S is made identical to the angle formed by the lenticules 41 and each of the right and left (lateral direction) side edges 42S of the lens sheet 40. By this means, by bonding the raised strip 42 to the lens sheet 41 in such a way that the lenticular portion 43 and the lenticules 41 are mutually aligned with the striation direction, it is possible to dispose the side surfaces 42S of the raised strip 42 parallel to the side edges 40S of the lens sheet 40.

Lens Sheet Modification Example 3

Figure 6:
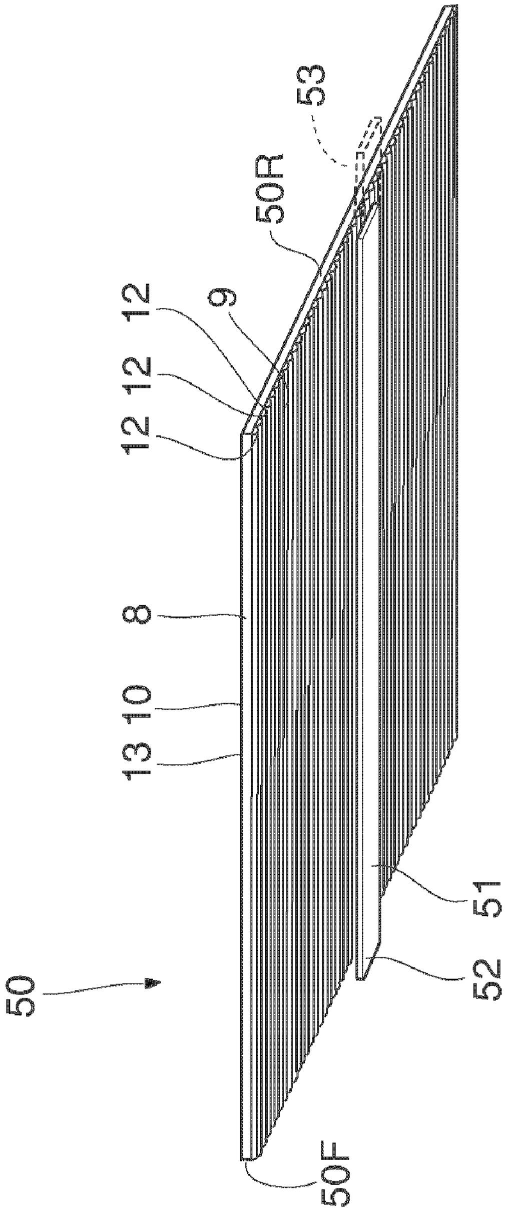
FIG. 6 is a backward perspective view showing a configuration of a third modification example of the lens sheet.

FIG. 6 shows a configuration of a lens sheet 50 which is a third modification example of the lens sheet 1. Identical reference numerals being given to the same components as those described in the first embodiment, a description thereof will be omitted.

In the lens sheet 50, as shown in FIG. 6, a protrusion 52 protruded forward from a front end 50F of the lens sheet 50 is provided at a front end of a raised strip 51 acting as a guided portion. By providing the protrusion 52 protruding forward from the front end 50F in this way, it is possible, when placing the lens sheet 50 on the sheet guide 4, to visually perceive the protrusion 52 from a top surface (the recording surface 13) side of the lens sheet 50. For this reason, when fitting the raised strip 51 into the guide groove 14, it is possible to easily align the raised strip 51 with the guide groove 14.

Also, it is also acceptable that a protrusion 53 protruding backward from a back end 50R of the lens sheet 50 is provided at a back end of the raised strip 51, as shown by a dotted line. By providing the protrusion 53 protruding backward from the back end 50R in this way, it is possible to cause the guide groove 14 to guide the raised strip 51 until a recording on the lens sheet 50 is completed. For this reason, it is possible to more reliably maintain a guiding condition of the lens sheet 50, easily keeping the conveying direction constant.

Recording Apparatus Modification Example 1

Figure 7:
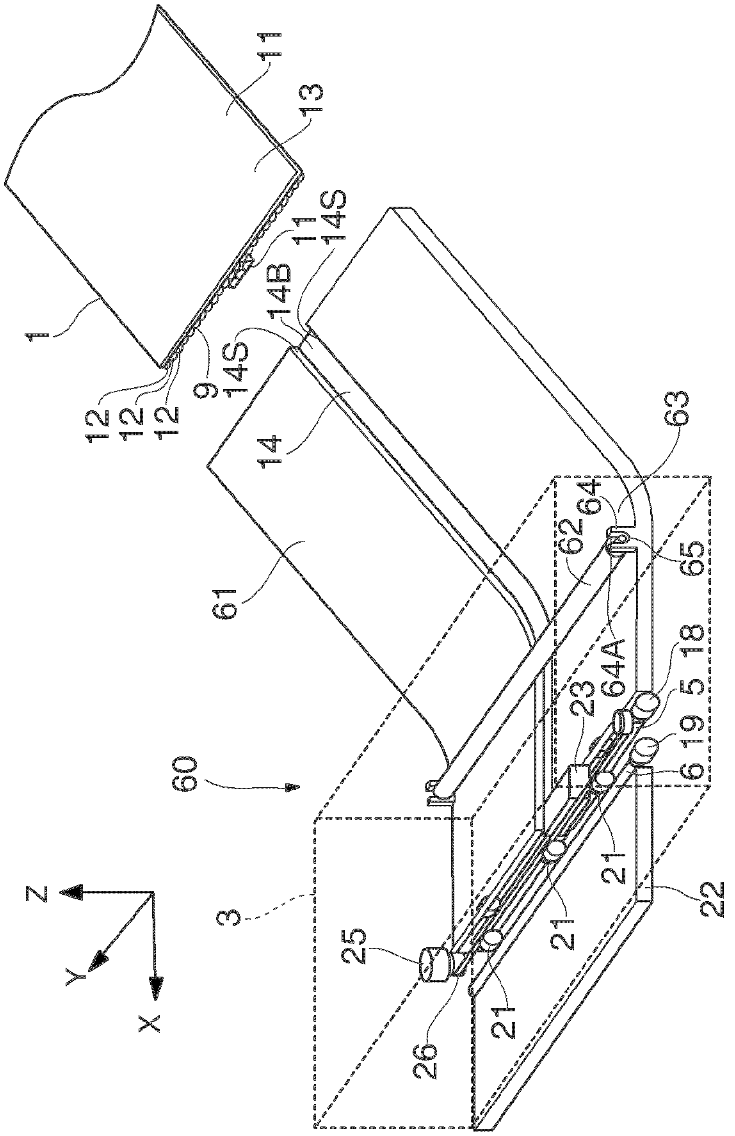
FIG. 7 is a forward perspective view showing a configuration of a first modification example of the recording apparatus.

FIG. 7 shows a configuration of a recording apparatus 60 which is a first modification example of the recording apparatus 2. Identical reference numerals being given to the same components as those described in the first embodiment, a description thereof will be omitted. The recording apparatus 60 has the same configuration as the recording apparatus 2, except for a configuration of a sheet guide 61 acting as a supporter.

The sheet guide 4 of the recording apparatus 2 is horizontally mounted on the housing 3, while the sheet guide 61 is configured to slant upward. In a case of configuring the sheet guide 61 in this way, a weight roller 62 is provided in a position of a curved portion 63 of the sheet guide 4.

By providing the weight roller 62 in this way, it is possible, in the curved portion 63, to prevent the raised strip 11 from coming off from the guide groove 14. The weight roller 62 is supported on bearings 64 via a shaft 65. The shaft 65, being rotatably supported in slots 64A which, being elongated in an up-down direction, are formed in the bearings 64, is configured in such a way as to be lifted up by the lens sheet 1 passing under the weight roller 62. Consequently, the lens sheet 1 passing under the weight roller 62 is pressed against the sheet guide 61 by the weight roller 62, maintaining the fitting of the raised strip 11 into the guide groove 14.

Lens Sheet Modification Example 4, Recording Apparatus Modification Example 2

Figure 8:
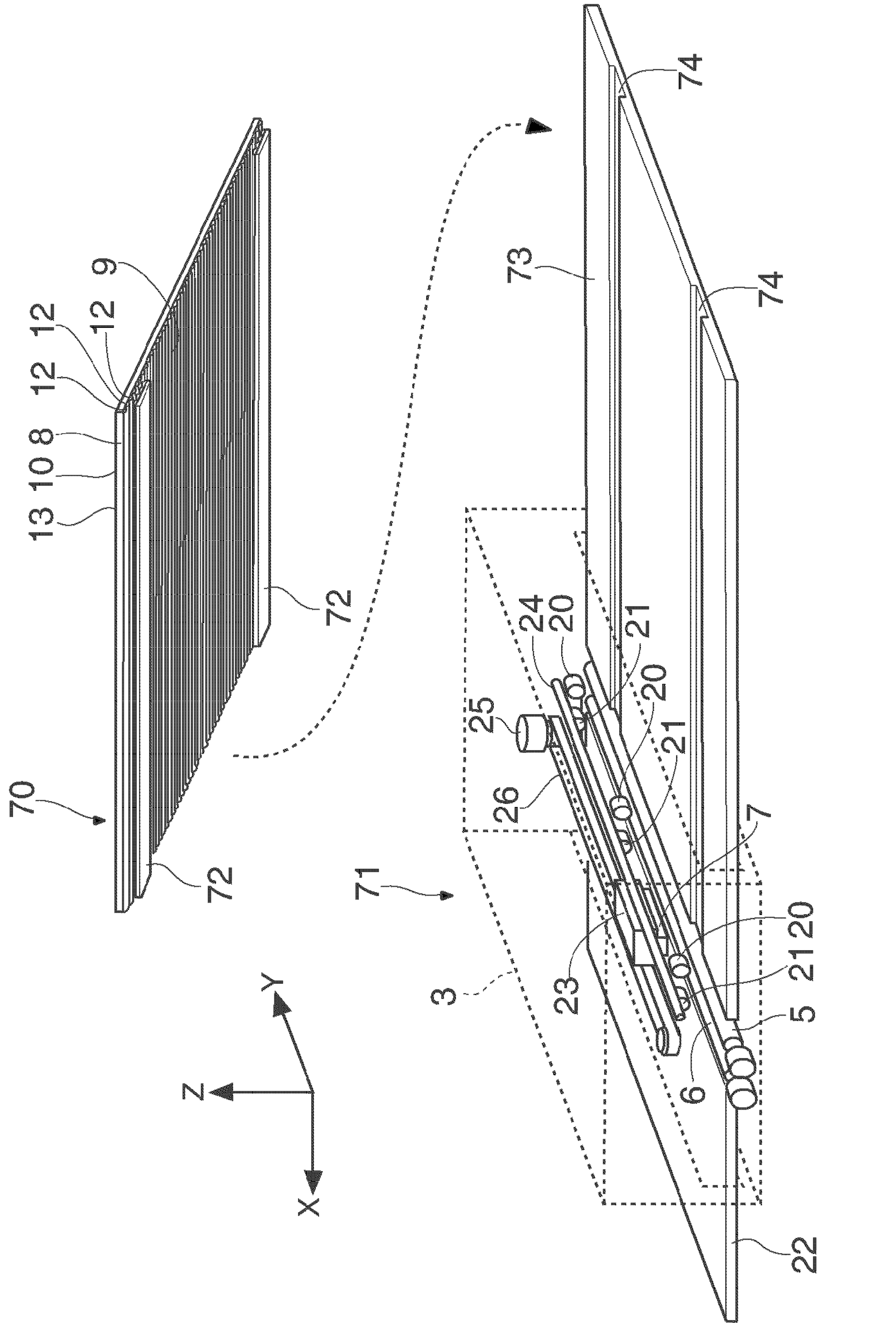
FIG. 8 is a view showing a fourth modification example of the lens sheet and a second modification example of the recording apparatus, and showing a condition in which the lens sheet is removed from the recording apparatus.

FIG. 8 shows configurations of a lens sheet 70 which is a fourth modification example of the lens sheet 1, and a recording apparatus 71 which is a second modification example of the recording apparatus 2. Identical reference numerals being given to the same components as those described in the first embodiment, a description thereof will be omitted.

As shown in FIG. 8, the lens sheet 70 is provided with raised strips 72 of the same configuration as the raised strip 11, one on each of the right and left sides. Also, a sheet guide 73 is provided with guide grooves 74 of the same configuration as the guide groove 14, one on each of the right and left sides, so as to correspond to the raised strips 72. The recording apparatus 71 has the same configuration as the recording apparatus 2, except for a configuration of the sheet guide 73. In this way, by arranging in such a way as to guide the lens sheet 70 in two places, it being possible to more reliably carry out a right-left direction positioning of the lens sheet 70 with the sheet guide 73, it is possible to more reliably carry out a maintenance of a conveyance of the lens sheet 70 in the main scanning direction. For this reason, it is possible to further improve an accuracy of a position of a recording on the lens sheet 70 by means of the recording head 7.

Second Embodiment of Lens Sheet

Figure 9:
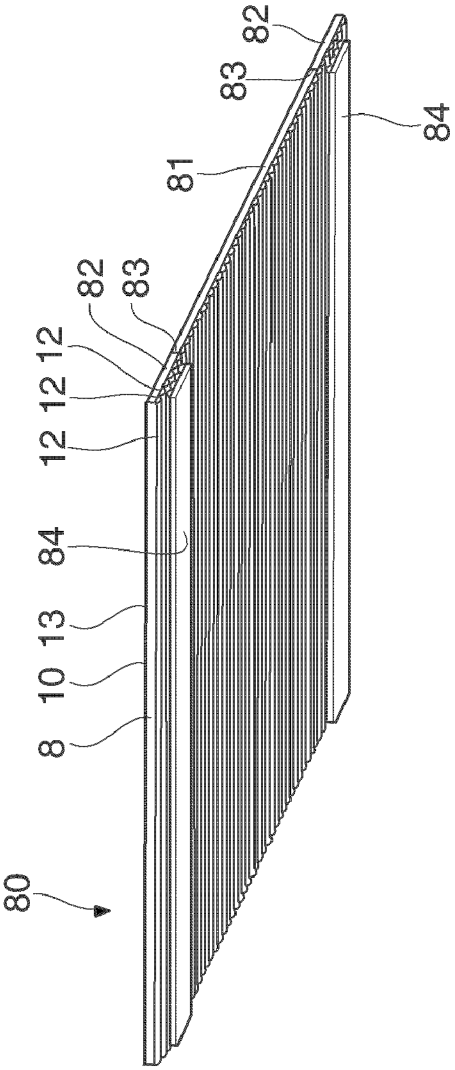
FIG. 9 is a perspective view showing a configuration of a second embodiment of the lens sheet.

Next, a description will be given, while referring to FIG. 9, of a configuration of a lens sheet 80 according to a second embodiment of the invention. Identical reference numerals being given to the same components as those described in the first embodiment and its modification examples, a description thereof will be omitted.

The lens sheet 80 is provided with a recording area 81, and raised strip installation areas 82, one outside each of right and left sides of the recording area 81. The lenticules 9 are provided in each raised strip installation area 82 in the same way as in the recording area 81, and also integrally formed with the recording area 81, but a perforation 83 acting as a separation structure is formed between the recording area and each raised strip installation area in the front-back direction. Consequently, the raised strip installation areas 82 can be snapped off from the recording area 81. By forming V-shaped grooves, too, in place of the perforations 83, it is possible to easily separate the raised strip installation areas 82 from the recording area 81.

A raised strip 84 of the same configuration as the raised strip 11 is attached to each raised strip installation area 82, configuring a guided portion. The lens sheet 80 provided with the raised strips 84, one on each of the right and left sides, in this way is placed on the sheet guide 73 provided with the two guide grooves 74 shown in FIG. 8, and conveyed while the raised strips 84 are being guided by the guide grooves 74, and a recording is carried out thereon by the recording head 7. Then, the raised strip installation areas 82 are separated from the lens sheet 80, after the recording thereon has finished, along the perforations 83, obtaining the recording area 81 portion as a recorded article.

As heretofore described, the raised strips 84 of the lens sheet 80 are provided in portions away from the recording area 81. As opposed to this, for example, in a case of arranging in such a way as to attach the raised strips 84 to the recording area 81 and, after a recording has finished, detach the raised strips 84 attached, there is a possibility that an adhesive material remains on the lenticules 9, the lenticules 9 are damaged during the detachment, or the like, with an image which can be seen via the lenticules 9 deteriorating. However, by providing the raised strips 84 in the portions away from the recording area 81 as with the lens sheet 80 of this embodiment, it is possible to prevent an occurrence of a problem such as damaging the lenticules 9 in the recording area 81. It not being necessary that a fixing of the raised strips 84 to the raised strip installation areas 82 is detachable, it is also acceptable to make it a strong adhesion allowing no detachment.

As the raised strip installation areas 82 are separated from the recording area 81, it is not necessary to carry out a recording on the raised strip installation areas 82. For this reason, it is preferable that image data input into the recording apparatus 71 are made image data corresponding to a right-left direction width of the recording area 81.

Lens Sheet Modification Example 5

Figure 10:
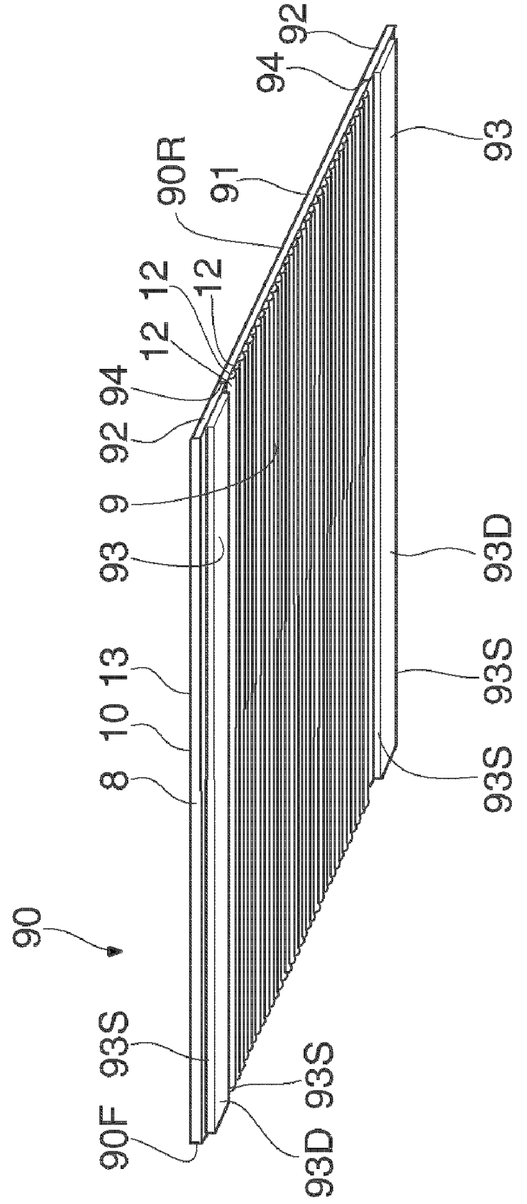
FIG. 10 is a backward perspective view showing a configuration of a fifth modification example of the lens sheet.

FIG. 10 shows a configuration of a lens sheet 90 which is a modification example of the lens sheet 80. Identical reference numerals being given to the same components as those described in the first embodiment and the like, a description thereof will be omitted.

The lens sheet 90 is provided with a recording area 91 in the same way as in the recording area 81 of the lens sheet 80, and raised strip installation areas 92, one outside each of right and left sides of the recording area 91, and a raised strip 93 is provided in each raised strip installation area 92. However, the lenticules 9 are not provided in either raised strip installation area 92, unlike each raised strip installation area 82. Also, the lenticular portion 27 is not provided in either raised strip 93, either, unlike each raised strip 84. That is, the raised strips 93, each taking on a shape of an elongated rectangular sheet body which does not have a portion corresponding to the lenticular portion 27, are configured as guided portions provided directly in the resin sheet 8 portions of the raised strip installation areas 92.

The raised strips 93 are provided from a back end edge 90R of the lens sheet 90 all the way to a front end edge 90F in the front-back direction, that is, in the striation direction of the lens elements 12. Right and left side surfaces 93S of each raised strip 93 are surfaces perpendicular to the recording surface 13 which is a top surface of the lens sheet 90, and form smooth planes which, being parallel to each other, extend in the striation direction of the lens elements 12. Also, bottom surfaces 93D of the raised strips 93 form smooth planes parallel to the recording surface 13. The raised strips 93 configured in this way are fitted into the guide grooves 74 provided in the recording apparatus 71 shown in FIG. 8, and guided by the guide grooves 74.

Consequently, in the same way as the lens sheet 70, the lens sheet 90 is placed on the sheet guide 73 provided with the two guide grooves 74 shown in FIG. 6, and conveyed while the raised strips 93 are being guided by the guide grooves 74. That is, a recording is carried out on the lens sheet 90 in a condition in which the conveyance in the direction perpendicular to the main scanning direction is maintained. In the lens sheet 90 after the recording thereon has finished, the raised strip installation areas 93 are separated along perforations 94, obtaining the recording area 91 portion as a recorded article. As the lens sheet 90 also has the raised strips 93 provided in portions away from the recording area 91 as with the lens sheet 80, it is possible to prevent an occurrence of a problem of damaging the lenticules 9 in the recording area 91, or the like.

Figure 11:
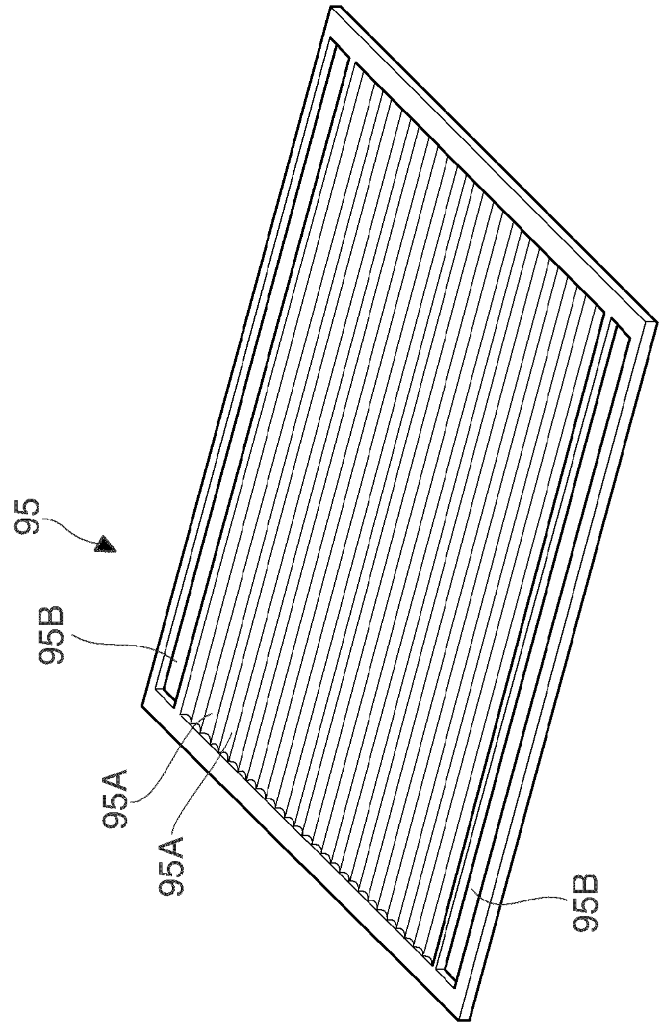
FIG. 11 is a perspective view showing a configuration of a jig for creating the lens sheet shown in FIG. 10.

Apart from providing the raised strips 93 by integrally molding them with the lenticules 9 and the resin sheet 8 by means of a mold tool, it is also acceptable to create the raised strips 93 using a jig 95 shown in FIG. 11 in such a way as to attach the resin sheet 8 to the lenticules 9 and the raised strips 93. In the case of using the jig 95, the lenticules 9 are fitted into depressions 95A, and also, resin sheet bodies which become the raised strips 93 are fitted into recessed portions 95B. Then, the resin sheet 8 is attached to the lenticules 9 and the raised strips 93 from above, creating the lens sheet 90 provided with the raised strips 93.

Third Embodiment of Lens Sheet, Second Embodiment of Recording Apparatus

Figure 12:
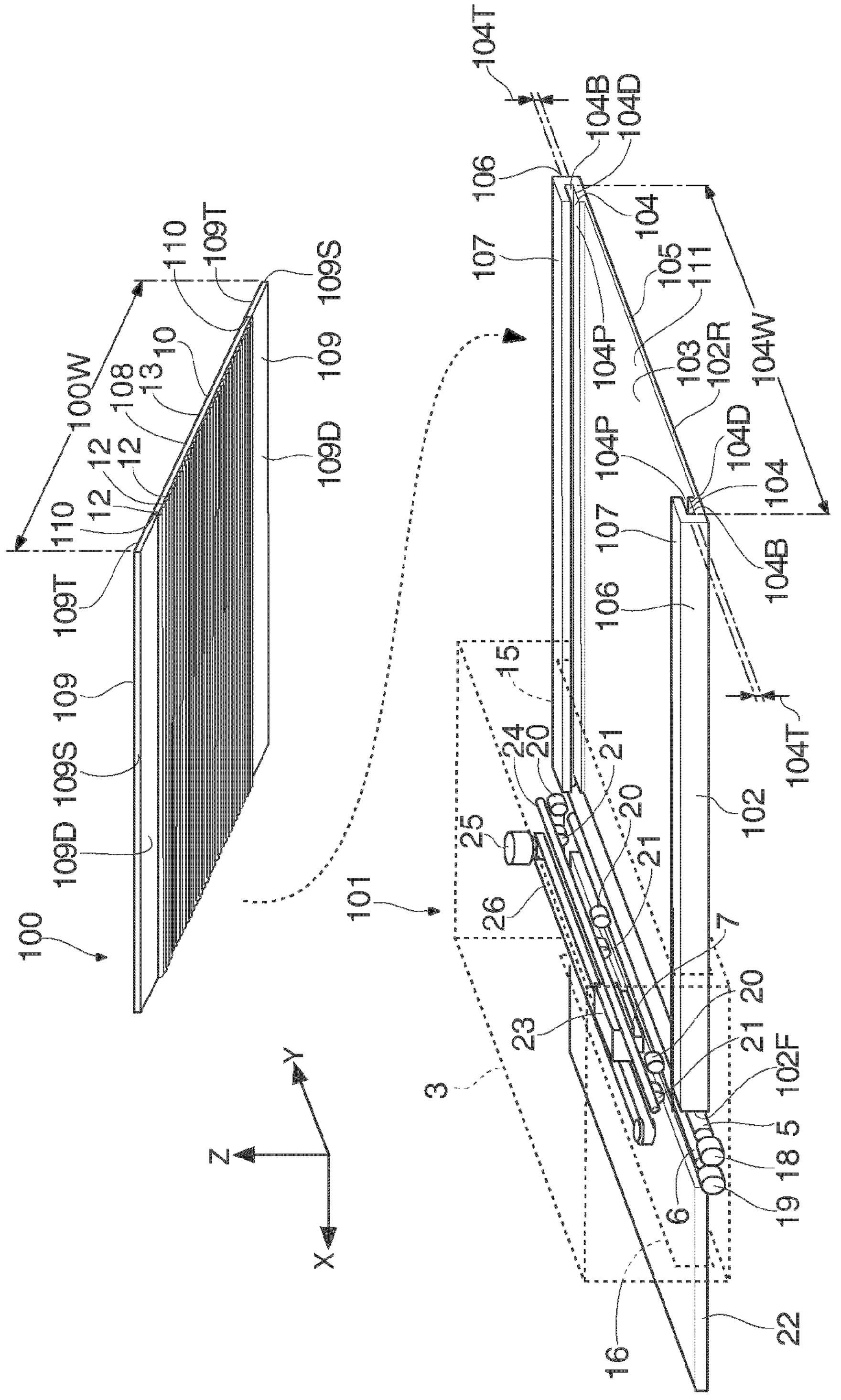
FIG. 12 is a view showing a third embodiment of the lens sheet and a second embodiment of the recording apparatus, and showing a condition in which the lens sheet is removed from the recording apparatus.

Next, a description will be given, while referring to FIG. 12, of configurations of a lens sheet 100 according to a third embodiment of the invention, and a recording apparatus 101 according to a second embodiment. Identical reference numerals being given to the same components as those described in the first embodiment and the like, a description thereof will be omitted.

The recording apparatus 101 has the same configuration as the recording apparatus 2, except for a configuration of a sheet guide 102 acting as a supporter. The sheet guide 102 has a conveying surface 103 which, forming a bottom surface of the lens sheet 100, supports the lenticules 9, and guide grooves 104 provided one on each of right and left sides of the conveying surface 103. Each guide groove 104 is configured by a bottom plate 105 forming the conveying surface 103, a side plate 106 provided on each of right and left ends of the bottom plate 105, and a projection 107 projecting inward from an upper end of the side plate 106. That is, the guide grooves 104, being grooves whose openings 104P face each other in the right-left direction, and whose bottoms 104B are formed of the side plates 106, are formed as grooves passing through from a back end 102R, to a front end 102F, of the sheet guide 102.

Meanwhile, the lens sheet 100 is provided with a recording area 108 and protrusions 109 as guided portions extended outward beyond right and left sides of the recording area 108. Then, the lens sheet 100 is configured in such a way that the protrusions 109 are fitted into the guide grooves 104 when the lens sheet 100 is placed on the sheet guide 102.

Right and left side surfaces 109S of each projection 109, being surfaces perpendicular to the recording surface 13 of the lens sheet 100, form smooth planes which, being parallel to each other, extend in the striation direction of the lens elements 12. Top surfaces 109T of the projections 109, are smooth surfaces flush with the recording surface 13, and also, bottom surfaces 109D form smooth planes parallel to the top surfaces 109T.

Also, the lens sheet 100 has a dimensional tolerance set in such a way that, when it is placed on the sheet guide 102 in such a way that the protrusions 109 are fitted into the guide grooves 104, it does not jolt in the right-left direction with respect to inner side surfaces of the side plates 106, that is, the bottoms 104B, and it can move in the front-back direction. That is, an interval 104W between the bottoms 104B of the right and left guide grooves 104, and an interval between the side surfaces 109S of the right and left protrusions 109 of the lens sheet 100, that is, a right-left direction width 100W of the lens sheet 100, each has a dimensional tolerance set in such a way that, when the lens sheet 100 is placed on the sheet guide 102 in such a way that the protrusions 109 are fitted into the guide grooves 104, the lens sheet 100 does not jolt in the right-left direction with respect to the guide grooves 104, and the lens sheet 100 can be moved in the front-back direction with respect to the sheet guide 102.

Consequently, the lens sheet 100, by the protrusions 109 being fitted into the guide grooves 104, attains a condition in which a right-left direction (main scanning direction) positioning has been carried out. That is, the lens sheet 100 is positioned by means of the protrusions 109 and the guide grooves 104 in such a way as not to rotate on the sheet guide 102 or move in the right-left direction. For this reason, in the lens sheet 100 conveyed by the feed roller 5 and the discharge roller 6, by it being conveyed in the condition in which the constant conveying direction is maintained in the direction perpendicular to the main scanning direction, it is possible to carry out a recording on the lens sheet 100 by means of the recording head 7 in the predetermined position. The protrusions 109, being made able to be snapped off from the recording area 108 by means of perforations 110 formed in the front-back direction, can be snapped off as necessary after a recording on the lens sheet 100 has finished.

An up-down direction width 104T of the guide grooves 104 has a dimensional tolerance set in such a way that the protrusions 109 do not jolt in the up-down direction, and the lens sheet 100 can move in the front-back direction. For this reason, it is possible to prevent the lens sheet 100 from coming out of contact with the conveying surface 103 due to an upward curvature or the like of the lens sheet 100. By preventing the lens sheet 100 from coming out of contact with the conveying surface 103, it being possible to always maintain a distance between the recording head 7 and the recording surface 13 of the lens sheet 100, it is possible to make the recording position highly accurate.

A depressed portion 111 depressed by an amount equivalent to a height of protrusions of the lenticules 9 from inner bottom surfaces 104D of the guide grooves 104 is formed in the conveying surface 103. For this reason, when the lens sheet 100 is placed on the sheet guide 102 in such a way that the protrusions 109 are fitted into the guide grooves 104, the protrusions 109 are guided by the guide grooves 104 without the bottom surfaces 109D of the protrusions 109 rising up from the inner bottom surfaces 104D of the guide grooves 104.

In the lens sheet 100 and recording apparatus 101 according to this embodiment, the bottoms 104B of the guide grooves 104 have a function of guiding the lens sheet 100 in the predetermined conveying direction and, in the sheet guide 102, the side surfaces 109S of the right and left protrusions 109 function as guided portions.

The side plates 106 are fixed to the bottom plate 105. That is, the interval 104W between the bottoms 104B is made invariable and fixed. For this reason, a guiding of the protrusions 109 can be reliably carried out without a guiding condition thereof changing, easily keeping the conveying direction of the lens sheet 100 constant.

Meanwhile, when a conveyance of the lens sheet 100 is carried out, the protrusions 109 make sliding contact with the bottoms 104B and bottom surfaces 104D of the guide grooves 104. Therein, it is also acceptable to arrange in such a way as to provide the bottoms 104B and bottom surfaces 104D of the guide grooves 104 with abrasion resistance by applying a measure, such as an attachment of a metal tape or coating with a fluororesin, to the bottoms 104B and the bottom surfaces 104D. By providing the bottoms 104B and the bottom surfaces 104D with abrasion resistance in this way, it being possible to suppress an abrasion and deformation of the bottoms 104B and bottom surfaces 104D, it is possible to maintain a conveying accuracy of the lens sheet 100 over a long period or a large number of conveyances.

Fourth Embodiment of Lens Sheet, Recording Apparatus Modification Example 3

Figure 13:
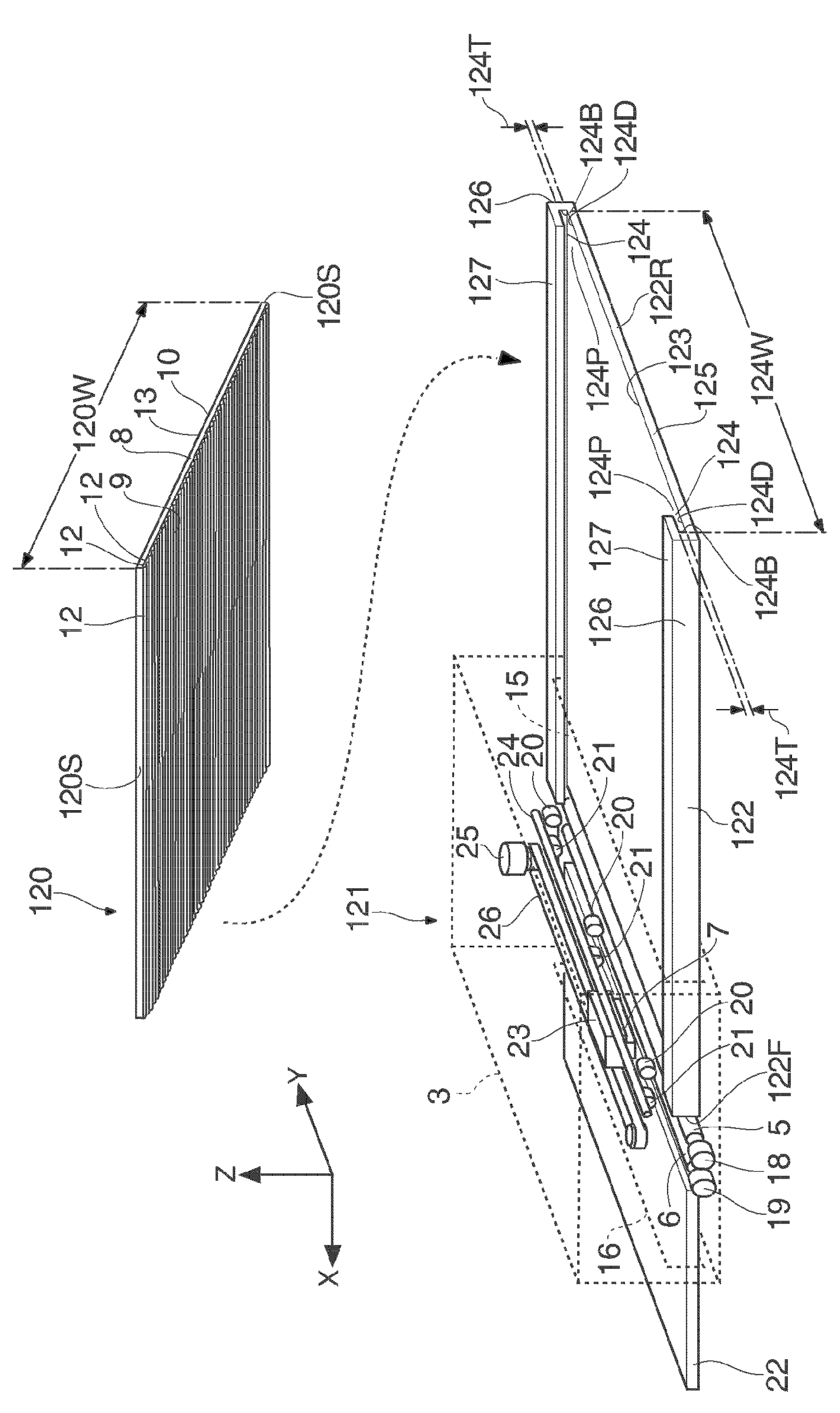
FIG. 13 is a view showing a fourth embodiment of the lens sheet and a second modification example of the recording apparatus, and showing a condition in which the lens sheet is removed from the recording apparatus.

Next, a description will be given, while referring to FIG. 13, of configurations of a lens sheet 120 according to a fourth embodiment of the invention, and a recording apparatus 121 according to a third modification example. Identical reference numerals being given to the same components as those described in the first embodiment and the like, a description thereof will be omitted. The recording apparatus 121 has the same configuration as the heretofore described recording apparatus 2, except for a configuration of a sheet guide 122 acting as a supporter.

Although each heretofore described lens sheet 1, 30, 100 or the like is provided with the raised strip 11, 32 or the like, or the protrusions 109, as the guided portions, it is also acceptable to use right and left side surfaces 120S themselves of the lens sheet 120 as guided portions. Meanwhile, the sheet guide 122 has a conveying surface 123 which, forming a bottom surface of the lens sheet 120, supports the lenticules 9, and guide grooves 124 provided one on each of right and left sides of the conveying surface 123. Each guide groove 124 is configured by a bottom plate 125 forming the conveying surface 123, a side plate 126 provided at each of right and left ends of the bottom plate 125, and a projection 127 projecting inward from an upper end of the side plate 126.

That is, the guide grooves 124, being grooves whose openings 124P face each other in the right-left direction, and whose bottoms 124B are formed of the side plates 126, are formed as grooves passing through from a back end 122R, to a front end 122F, of the sheet guide 122. Then, the guide grooves 124 are configured in such a way that right and left portions of the lens sheet 120 are fitted into them when the lens sheet 120 is placed on the sheet guide 122.

That is, an interval 124W between bottoms 124B of the right and left guide grooves 124, and an interval between the right and left side surfaces 120S of the lens sheet 120, that is, a right-left direction width 120W of the lens sheet 120, each has a dimensional tolerance set in such a way that, when the lens sheet 120 is placed on the sheet guide 122 in such a way that the right and left portions of the lens sheet 120 are fitted into the guide grooves 124, the lens sheet 120 does not jolt in the right-left direction with respect to the guide grooves 124, and the lens sheet 120 can be moved in the front-back direction with respect to the sheet guide 122.

Also, the right and left side surfaces 120S of the lens sheet 120 are surfaces perpendicular to the recording surface 13 of the lens sheet 120, and form smooth planes which, being parallel to each other, extend in the striation direction of the lens elements 12. Consequently, by the lens sheet 120 being placed on the sheet guide 122 in such a way that the right and left portions thereof are fitted into the guide grooves 124, the right and left side surfaces 120S of the lens sheet 120 are guided by the right and left bottoms 124B. For this reason, the lens sheet 120 attains a condition in which a right-left direction (main scanning direction) positioning has been carried out. That is, the lens sheet 120 is positioned by means of the guide grooves 124 in such a way as not to rotate on the sheet guide 122 or move in the right-left direction. That is, in the lens sheet 120 conveyed by the feed roller 5 and the discharge roller 6, by it being conveyed in the condition in which the constant conveying direction is maintained in the direction perpendicular to the main scanning direction, it is possible to carry out a recording on the lens sheet 120 by means of the recording head 7 in the predetermined position.

In the lens sheet 120 according to this embodiment and the recording apparatus 121 according to the modification example, the bottoms 124B of the guide grooves 124 have a function of guiding the lens sheet 120 in the predetermined conveying direction and, in the lens sheet 120, the right and left side surfaces 120S function as guided portions.

Also, an up-down direction width 124T of the guide grooves 124 has a dimensional tolerance set in such a way that the lens sheet 120 does not jolt in the up-down direction, and the lens sheet 120 can move in the front-back direction. For this reason, it is possible to prevent the lens sheet 120 from coming out of contact with the conveying surface 123 due to an upward curvature or the like of the lens sheet 120. By preventing the lens sheet 120 from coming out of contact with the conveying surface 123, it being possible to always maintain a distance between the recording head 7 and the recording surface 13 of the lens sheet 120, it is possible to make the recording position highly accurate.

The side plates 126 are fixed to the bottom plate 125. That is, the interval 124W between the bottoms 124B is made invariable and fixed. For this reason, a guiding of the side surfaces 120S can be reliably carried out without a guiding condition thereof changing, easily keeping the conveying direction of the lens sheet 120 constant.

Meanwhile, when a conveyance of the lens sheet 120 is carried out, the side surfaces 120S make sliding contact with the bottoms 124B of the guide grooves 124. Therein, it is also acceptable to arrange in such a way as to provide the bottoms 124B with abrasion resistance by applying a measure, such as an attachment of a metal tape or a coating with a fluororesin, to the bottoms 124B of the guide grooves 124. By providing the bottoms 124B with abrasion resistance in this way, it being possible to suppress an abrasion and deformation of the bottoms 124B, it is possible to maintain a conveying accuracy of the lens sheet 120 over a long period or a large number of conveyances.

In each of the heretofore described embodiments and their modification examples, it is preferable that a guided portion of the lens sheet 1 or the like, such as the raised strip 11 or the like provided on the lens sheet, is formed of a material having a lower hardness than a material of a guide portion, such as the guide groove 14 or the bottoms 104B, provided on a sheet guide, such as the sheet guide 4, included in a recording apparatus such as the recording apparatus 2. For example, the guided portion is formed of a material such as PET (Polyethylene Terphthalate) or an acrylic, while on the other hand, the guide portion is formed of a material such as a polycarbonate or FRP (Fiber Reinforced Plastic).

By the guided portion being formed of a material having a lower hardness than that of the guide portion, it being possible to suppress an abrasion and deformation of the guide portion due to a sliding contact with the guided portion, it is possible to maintain the conveying accuracy of the lens sheet over a long period or a large number of conveyances. That is, the guided portion being an expendable item provided for each lens sheet, it is sufficient to prevent an abrasion and deformation thereof at least only while the lens sheet is being conveyed. Meanwhile, the guide portion is repeatedly used every time the lens sheet is conveyed. For this reason, it is required that the guide portion is not easily abraded or deformed even due to a prolonged use or a large number of uses. Therein, as heretofore described, by the guided portion being formed of a material having a lower hardness than that of the guide portion, an improvement in an abrasion resistance of the guide portion being achieved, it is possible to maintain the conveying accuracy of the lens sheet over a long period or a large number of conveyances.

In a lens sheet such as the lens sheet 1, the resin sheet 8 being formed separately from the lenticules 9, a configuration is such that, using the resin sheet 8 as a bearer of the lenticules 9, the lenticules 9 are formed on the resin sheet 8. However, it is also acceptable that a lens sheet such as the lens sheet 1 is configured by integrally molding a portion bearing the lenticules 9, which corresponds to the resin sheet 8, and the lenticules 9.

Detection of Conveying Angle

Meanwhile, in a case in which a configuration relating to a conveying accuracy of a lens sheet such as the lens sheet 1 or 30, such as a position of a mounting of a sheet guide such as the sheet guide 4 on the housing 3, a position of a formation of a raised strip such as the raised strip 11, each protrusion 109 or each side surface 120S, or furthermore, a position of a formation of a guide groove such as the guide groove 14 or each guide groove 104, is set in such a way that the lens sheet can be conveyed with high accuracy in the direction perpendicular to the main scanning direction, the lens sheet can be conveyed to the predetermined position. For this reason, it is possible to carry out a recording in the predetermined position. On the other hand, for example, in a case in which the position of the mounting of the sheet guide on the housing 3, or the like, is not set in such a way that the lens sheet can be conveyed in the direction perpendicular to the main scanning direction, the lens sheet is conveyed inclined with respect to the direction perpendicular to the main scanning direction. As a result thereof, the lens sheet being conveyed while being displaced either rightward or leftward depending on an inclined direction as it is conveyed, it is impossible to carry out a recording in the predetermined position on the lens sheet.

However, for example, the lens sheet 1 is conveyed in a condition in which the raised strip 11 which is the guided portion is guided by the guide groove 14 which is the guide portion. With regard to the other lens sheets (the lens sheet 30 and the like) too, in the same way, as the guided portion (the raised strip 32 or the like) of each of them is conveyed by a guide portion (the guide groove 14 or the like) corresponding to each guided portion, it is conveyed with a certain inclined condition remaining maintained. That is, a distance the lens sheet is conveyed is proportional to an amount by which the lens sheet is displaced rightward or leftward. Consequently, by measuring in advance an inclination angle of the conveying direction of the lens sheet with respect to the direction perpendicular to the main scanning direction, and correcting recording image data for carrying out a recording in response to the inclination angle, it is possible, even when the lens sheet is conveyed inclined, to carry out a recording in the predetermined position on the lens sheet.

Figure 14:
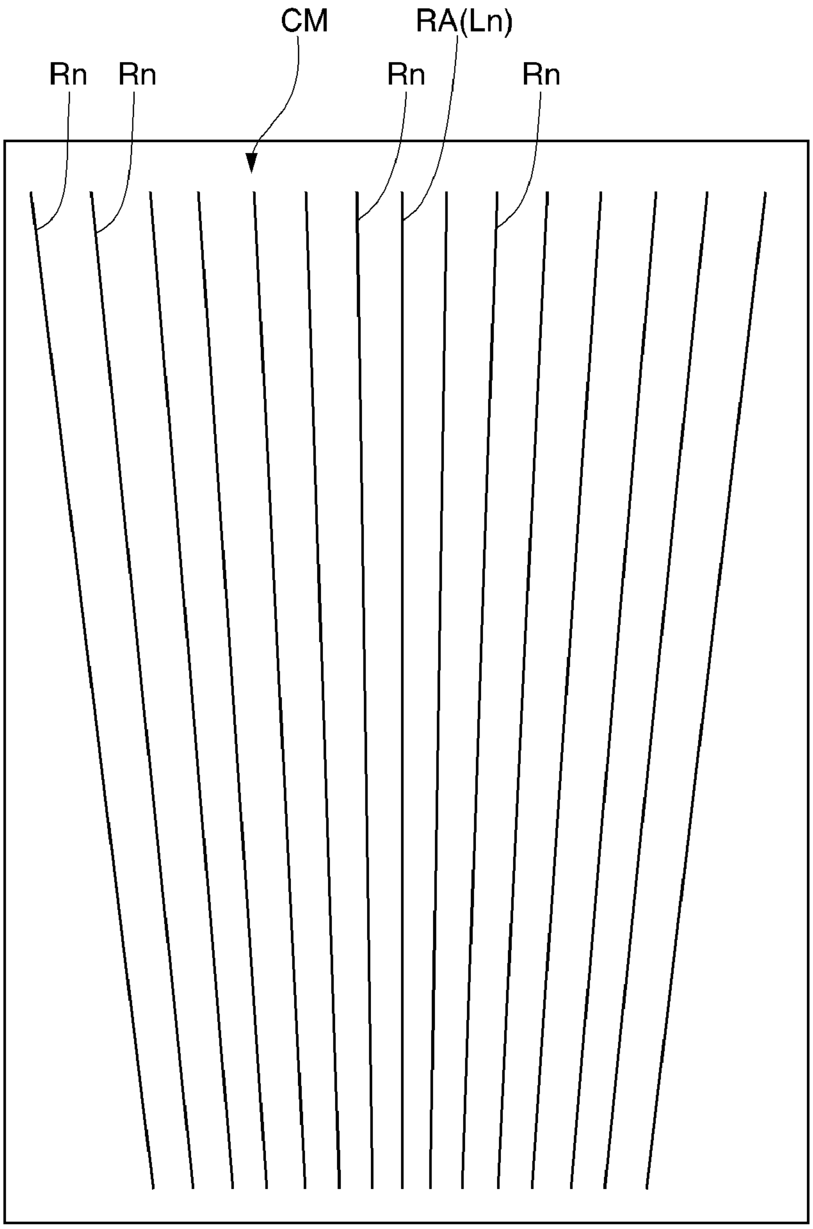
FIG. 14 is a view showing recording contents of an inspection image.

The measurement of the inclination angle can be carried out in the following way. As shown in FIG. 14, an inspection image CM configured of a plurality of lines Rn, which is an image for an inspection, is recorded on the lens sheet by the recording apparatus 2 (60, 71, 101 or 121). In the image data, the lines Rn are taken to have a configuration in which a central line RA, among the lines Rn, being aligned with the predetermined conveying direction, inclinations of lines Rn lying on right and left sides of the line RA are accumulated centered on the line RA, in order, at each identical angle in directions differing between the right and left sides.

Figure 15:
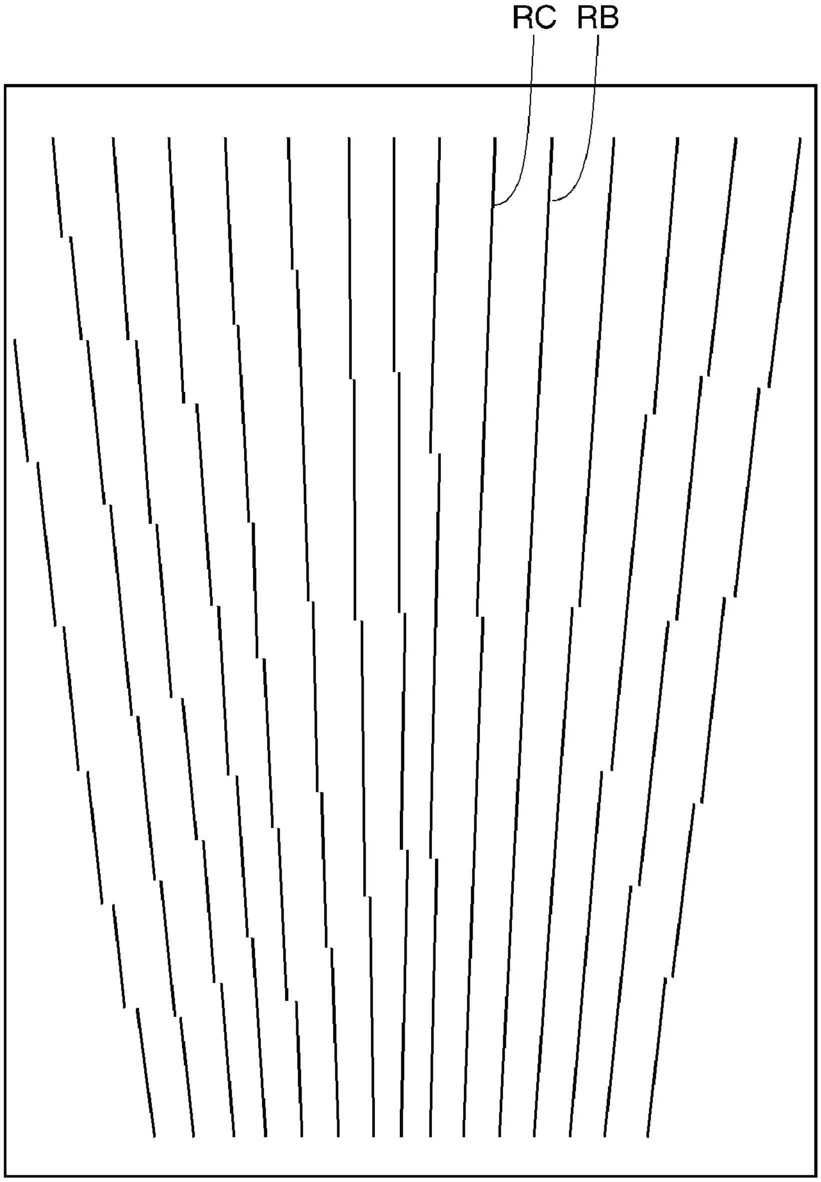
FIG. 15 is a view showing an image when the inspection image is seen from a lenticule side.

For example, lines Rn on the right side of the line RA are set in such a way that their inclination angles are increased in order at 0.01 degree intervals in a clockwise direction looking in the conveying direction, while lines Rn on the left side of the line RA are set in such a way that their inclination angles are increased in order at 0.01 degree intervals in a counter-clockwise direction looking in the conveying direction. Based on this kind of inspection image data, the inspection image CM is recorded on the lens sheet conveyed while being guided by the guide portion. Then, on looking at the inspection image CM recorded on the lens sheet from the lenticule side, as shown in FIG. 15, a line RB, among the lines Rn, recorded along the bus line (ridge line) of the lens elements of the lenticules can be visually perceived as one continuous line. On the other hand, lines Rn not recorded along the bus lines (ridge lines) of the lens elements, as they are recorded astride a plurality of lens elements, become lines which are each discontinuously segmented in either the right or left direction like, for example, a line RC.

Consequently, an inclination angle of a line Rn, among the lines Rn, corresponding to the line RB which can be seen as one line via the lenticules can be measured as an inclination angle at which the conveying direction of the lens sheet is inclined in the direction perpendicular to the main scanning direction. Then, corrected image data in which are rotated the recording image data are generated based on the inclination angle measured. By carrying out a recording of an image on the lens sheet 1 based on the corrected image data, it is possible to record the image in the predetermined position even in a case in which the lens sheet is conveyed inclined.

Although the heretofore described measurement of the inclination angle in the conveying direction of the lens sheet is carried out using one kind of inspection image in which lines are formed at inclination angles of 0.01 degree intervals, it is also acceptable to measure an inclination angle in the conveying direction of the lens sheet using two kinds of inspection image with different inclination angle variations. For example, a first inspection image in which lines are formed at inclination angles of 0.05 degree intervals is recorded on the lens sheet, and a line is specified which has a longest line segment when looking at the inspection image via the lenticules. Subsequently, a second inspection image in which lines are formed at inclination angles of 0.01 degree intervals on the right and left sides centered on the inclination angle of the line is recorded on another lens sheet. Then, a line is specified which has a longest line segment when looking at the second inspection image via the lenticules. An inclination of the line can be measured as an inclination angle which a direction in which the lens sheet is conveyed forms with respect to the direction perpendicular to the main scanning direction.

In this way, by measuring an inclination angle in a direction in which the lens sheet is conveyed using the two kinds of inspection image, it is possible to widen a range of measurable inclination angles, as well as carrying out a highly accurate measurement. That is, in the case of only the inspection image in which lines are formed at inclination angles of 0.01 degree intervals, a measurement of inclination angles can be carried out only up to degrees multiplied by a number of lines of 0.01 degree intervals on both sides of a central line. However, by using the inspection image in which lines are formed at inclination angles of 0.05 degree intervals, it is possible to measure a wide range of inclination angles, and furthermore after that, by using the inspection image in which lines are formed at inclination angles of 0.01 degree intervals, it is possible to carry out a highly accurate measurement of inclination angles. By increasing kinds of inspection image, it is possible to carry out a measurement of conveying inclination angles in a wider range and with a higher accuracy.

The entire disclosure of Japanese Patent Application No. 2007-270980, filed Oct. 18, 2007 is expressly incorporated by reference herein.

What is claimed is:

1. A recording medium, comprising:

a cylindrical lens provided above surface of the recording medium, wherein the cylindrical lens fits into a guide member provided above a sheet guide of a printer, the guide member having at least one of the raised portion and depression portion.

2. The recording medium according to claim 1, further comprising:

an image forming layer formed above the opposite side of the cylindrical lens, wherein the image forming layer has a recording area;

wherein the guide member conform to the cylindrical lens and is provided opposite of outside of the recording area.

3. The recording medium according to claim 2, wherein recording medium comprises a plurality of cylindrical lenses and a plurality of guides, wherein the guide has the same shape as the cylindrical lens, and wherein the number of cylindrical lenses is larger than the number of guides.

4. The recording medium according to claim 1, wherein the guide member is detachably provided above the printer.

5. The recording medium according to claim 4, wherein recording medium comprises a plurality of cylindrical lenses and a plurality of guides, wherein the guide has the same shape as the cylindrical lens, and wherein the number of cylindrical lenses is larger than the number of guides.

6. The recording medium according to claim 1, wherein recording medium comprises a plurality of cylindrical lenses and a plurality of guides, wherein the guide has the same shape as the cylindrical lens, and wherein the number of cylindrical lenses is larger than the number of guides.

* * * * *